(12) United States Patent
Chieng

(10) Patent No.: US 10,110,127 B2
(45) Date of Patent: Oct. 23, 2018

(54) METHOD AND SYSTEM FOR DC-DC VOLTAGE CONVERTERS

(71) Applicant: Intersil Americas LLC, Milpitas, CA (US)

(72) Inventor: Daniel Chieng, Austin, TX (US)

(73) Assignee: INTERSIL AMERICAS LLC, Milpitas, CA (US)

(*) Notice: Subject to any disclaimer, the term of this patent is extended or adjusted under 35 U.S.C. 154(b) by 0 days.

(21) Appl. No.: 15/133,463

(22) Filed: Apr. 20, 2016

(65) Prior Publication Data

US 2017/0163155 A1 Jun. 8, 2017

Related U.S. Application Data

(60) Provisional application No. 62/263,211, filed on Dec. 4, 2015.

(51) Int. Cl.
| | |
|---|---|
| *H02M 3/158* | (2006.01) |
| *H02M 1/08* | (2006.01) |
| *G05F 1/46* | (2006.01) |
| *H02M 3/156* | (2006.01) |
| *H02M 1/00* | (2006.01) |

(52) U.S. Cl.
CPC ............ *H02M 3/158* (2013.01); *G05F 1/46* (2013.01); *H02M 1/08* (2013.01); *H02M 3/156* (2013.01); *H02M 3/1584* (2013.01); *H02M 3/1588* (2013.01); *H02M 2001/0009* (2013.01); *H02M 2003/1586* (2013.01)

(58) Field of Classification Search
CPC .................................................. H02M 3/158
See application file for complete search history.

(56) References Cited

U.S. PATENT DOCUMENTS

| | | | |
|---|---|---|---|
| 5,312,445 A * | 5/1994 | Nappholz | A61N 1/365 607/9 |
| 5,619,405 A | 4/1997 | Kammiller et al. | |
| 5,740,023 A | 4/1998 | Brooke et al. | |
| 6,278,263 B1 | 8/2001 | Walters et al. | |
| 6,518,738 B1 | 2/2003 | Wang | |
| 6,791,306 B2 | 9/2004 | Walters et al. | |

(Continued)

OTHER PUBLICATIONS

David Beck, "Method and System for DC-DC Voltage Converters", U.S. Appl. No. 15/133,487, filed Apr. 20, 2016, pp. 1-29.

(Continued)

*Primary Examiner* — Jue Zhang
*Assistant Examiner* — Trinh Q Dang
(74) *Attorney, Agent, or Firm* — Foley & Lardner LLP

(57) ABSTRACT

On embodiment pertains to an apparatus including a control loop configured to receive an output voltage sense signal. The control loop includes a compensator; a PWM signal generator coupled to an output of the compensator; a reference circuit configured to receive a tracking signal, and which is configured to low bandwidth low pass filter the tracking signal when the tracking signal amplitude becomes substantially constant and representative of an output voltage that is substantially non-zero; and an error amplifier having a first input coupled to an output of the reference circuit, a second input configured to receive the output voltage sense signal, and an output coupled to the compensator.

26 Claims, 7 Drawing Sheets

(56) References Cited

U.S. PATENT DOCUMENTS

| | | | |
|---|---|---|---|
| 7,602,155 | B2 | 10/2009 | Markowski |
| 7,919,952 | B1 | 4/2011 | Fahrenbruch |
| RE43,414 | E | 5/2012 | Walters et al. |
| 8,239,597 | B2 | 8/2012 | Wishneusky |
| 8,274,265 | B1 | 9/2012 | Khanna et al. |
| 8,575,910 | B2 | 11/2013 | Young |
| 9,785,166 | B2 | 10/2017 | Beck |
| 2002/0048069 | A1* | 4/2002 | Ibukuro ............. H04B 10/67 398/140 |
| 2003/0161167 | A1 | 8/2003 | Barnett et al. |
| 2006/0017424 | A1 | 1/2006 | Wood et al. |
| 2006/0072253 | A1* | 4/2006 | Rozen ............. G06F 1/3203 361/18 |
| 2006/0239046 | A1 | 10/2006 | Zane et al. |
| 2008/0054869 | A1 | 3/2008 | Chang |
| 2008/0309300 | A1 | 12/2008 | Liu et al. |
| 2010/0072964 | A1 | 3/2010 | Qiu et al. |
| 2010/0085024 | A1 | 4/2010 | Houston et al. |
| 2010/0181975 | A1* | 7/2010 | Piselli ............. H02M 3/33507 323/282 |
| 2010/0244799 | A1 | 9/2010 | Moussaoui |
| 2011/0199065 | A1 | 8/2011 | Kume |
| 2012/0139513 | A1 | 6/2012 | Sreenivas |
| 2014/0253075 | A1 | 9/2014 | Tuten |
| 2016/0087595 | A1* | 3/2016 | Gopalraju ............. H02M 3/158 323/271 |
| 2016/0274651 | A1 | 9/2016 | Laur |
| 2017/0060154 | A1 | 3/2017 | Ozawa |
| 2017/0141684 | A1 | 5/2017 | Beck |
| 2017/0163155 | A1 | 6/2017 | Chieng |
| 2017/0207723 | A1 | 7/2017 | Zhang et al. |
| 2018/0032096 | A1 | 2/2018 | Beck |

OTHER PUBLICATIONS

David Beck, "Method and System for DC-DC Voltage Converters", U.S. Appl. No. 15/133,487, filed Apr. 20, 2016, Drawing pp. 1-7.

David Beck, "Method and System for DC-DC Voltage Converters", U.S. Appl. No. 15/133,508, filed Apr. 20, 2016, pp. 1-33.

David Beck, "Method and System for DC-DC Voltage Converters", U.S. Appl. No. 15/133,508 filed Apr. 20, 2016, Drawings pp. 1-8.

Daniel Chieng, "Method and System for DC-DC Voltage Converters", U.S. Appl. No. 15/133,463, filed Apr. 20, 2016, Drawing pp. 1-7.

Daniel Chieng, "Method and System for DC-DC Voltage Converters", U.S. Appl. No. 15/133,463, filed Apr. 20, 2016, pp. 1-43.

Final Office Action for U.S. Appl. No. 12/498,287, dated Jan. 12, 2012, pp. 1-9.

Mohammad Ali Bagherzadeh et al., "Variable Gain Adaptive Controller Based on Sensitivity Method for DC-DC Boost Converter", The 22nd Iranian Conference on Electrical Engineering (ICEE 2014) May 20-22, 2014, pp. 787-792.

Sang Woo Kang et al., "Gain-Scheduled Control Using Voltage Controlled Oscillator with Variable Gain for a LLC Resonant Converter", IEEE 2014, pp. 4466-4471.

Stefano Saggini et al., "A Simple Digital Autotuning for Analog Controller in SMPS", IEEE Transactions on Power Electronics, vol. 25, No. 8, Aug. 2010, pp. 2170-2178.

U.S. Notice of Allowance on U.S. Appl. No. 15/133,508 dated Jun. 9, 2017.

U.S. Office Action on U.S. Appl. No. 15/133,487 dated Jun. 2, 2017.

U.S. Office Action on U.S. Appl. No. 15/133,487 dated Nov. 1, 2017.

Zdravko Lukic et al., "Multibit—Σ-Δ PWM Digital Controller IC for DC-DC Converters Operating at Switching Frequencies Beyond 10 MHz", IEEE Transactions on Power Electronics, vol. 22, No. 5, Sep. 2007, pp. 1693-1707.

\* cited by examiner

METHOD AND SYSTEM FOR DC-DC VOLTAGE CONVERTERS

CROSS-REFERENCED TO RELATED APPLICATION

This application claims the benefit of provisional U.S. Patent Application Ser. No. 62/263,211 filed Dec. 4, 2015, which is incorporated herein by reference in its entirety.

It should be noted that some details of the Figures have been simplified and are drawn to facilitate understanding of the inventive embodiments rather than to maintain strict structural accuracy, detail, and scale. It should also be noted that not all circuit elements and operating steps are illustrated, as the general methods of circuit design and operation are well known. It should also be noted that not all details about voltage converters are illustrated, as general designs of voltage converters are well known.

Reference will now be made in detail to the present embodiments (exemplary embodiments) of the present teachings, examples of which are illustrated in the accompanying drawings. Wherever possible, the same reference numbers will be used throughout the drawings to refer to the same or like parts.

DESCRIPTION OF THE EMBODIMENTS

Embodiments relate generally DC-DC voltage converters configured to receive a tracking voltage.

Figure 1:
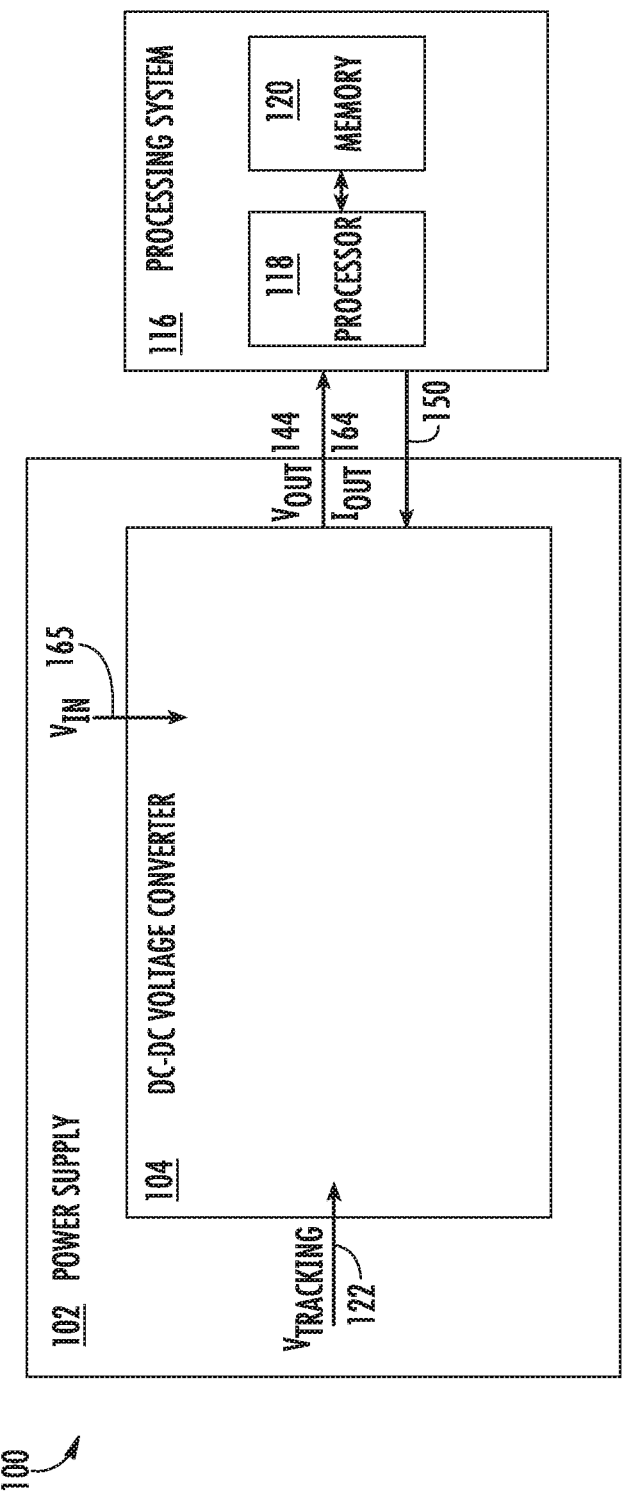
FIG. 1 illustrates an embodiment of an electrical system.

FIG. 1 illustrates an exemplary electrical system 100 comprising a load, e.g. a processing system 116, and power supply 102 that includes a voltage converter, e.g. a DC-DC voltage converter 104. The processor 118 can be electrically coupled to, communicate with, and/or control the voltage converter through a data bus 150. This electrical system 100 may be a device related to telecommunications, automobiles, semiconductor test and manufacturing equipment, consumer electronics, or any type of electronic equipment.

The power supply 102 may be an AC to DC power supply, or a DC supply powered by a battery. The power supply 102 provides a DC-DC voltage converter 104 with an input voltage 165, $V_{IN}$, to power the DC-DC voltage converter 104. The DC-DC voltage converter 104 has an output voltage 144, $V_{OUT}$, and an output current 164, $I_{OUT}$.

In one embodiment, the processing system 116 may include a processor 118 and memory 120 which are coupled to one another. In another embodiment, the processor 118 may be one or more microprocessors, microcontrollers, embedded processors, digital signal processors, or a combination of two or more of the foregoing. The memory 120 may be one or more volatile memories and/or non-volatile memories such as static random access memory, dynamic random access memory, read only memory, flash memory, or a combination of two or more of the foregoing. The DC-DC voltage converter 104 provides a voltage to the load, the processing system 116, which is more precise and efficient than a voltage provided by other voltage sources such as low drop out regulators.

The DC-DC voltage converter 104 illustrated in FIG. 1 can be implemented as a current mode or a voltage mode DC-DC voltage converter. Voltage mode DC-DC voltage converters are often used to avoid having to implement circuitry to measure instantaneous current levels. The DC-DC voltage converter 104 subsequently illustrated is a voltage mode DC-DC voltage converter. However, embodiments of the present invention may be used in a current mode DC-DC voltage converter.

Multiphase DC-DC voltage converters are used to provide higher capacity and more accurate output current 164. Digital DC-DC voltage converters are used to provide higher efficiency and operating flexibility.

The DC-DC voltage converter 104 is further configured to receive a tracking voltage 122 which is used to scale the reference voltage of the DC-DC voltage converter 104. The tracking voltage 122 is injected to control the sequencing of turning on and/or off multiple DC-DC voltage converters 104 and/or power supplies, or alternatively to switch the DC-DC voltage converter 104 between high and low power modes (e.g. when a master power supply increases or lowers its output voltage, then a slave power supply respectively increases or lowers its output voltage). In one embodiment, the tracking voltage 122 is supplied to a master phase and/or module and respectively one or more slave phases and/or modules. In another embodiment, the tracking voltage 122 is chosen and implemented by a designer or user of the power supply 102.

The DC-DC voltage converter 104 of FIG. 1 is advantageously formed with noise reduction of the tracking voltage 122 by increasing the filtering of the tracking voltage 122 when the value of the tracking voltage 122 is substantially constant and is representative of a substantially non-zero output voltage 144 of the DC-DC voltage converter 104. The DC-DC voltage converter 104 permits reducing the noise in a tracking signal while permitting satisfactorily rapid response to transients in the tracking signal.

The value of the tracking voltage 122 is substantially constant when it falls within the subsequently described steady state thresholds. The output voltage is substantially non-zero when it is within other threshold(s) that are set by the designer or user of the power supply 102.

Figure 2A:
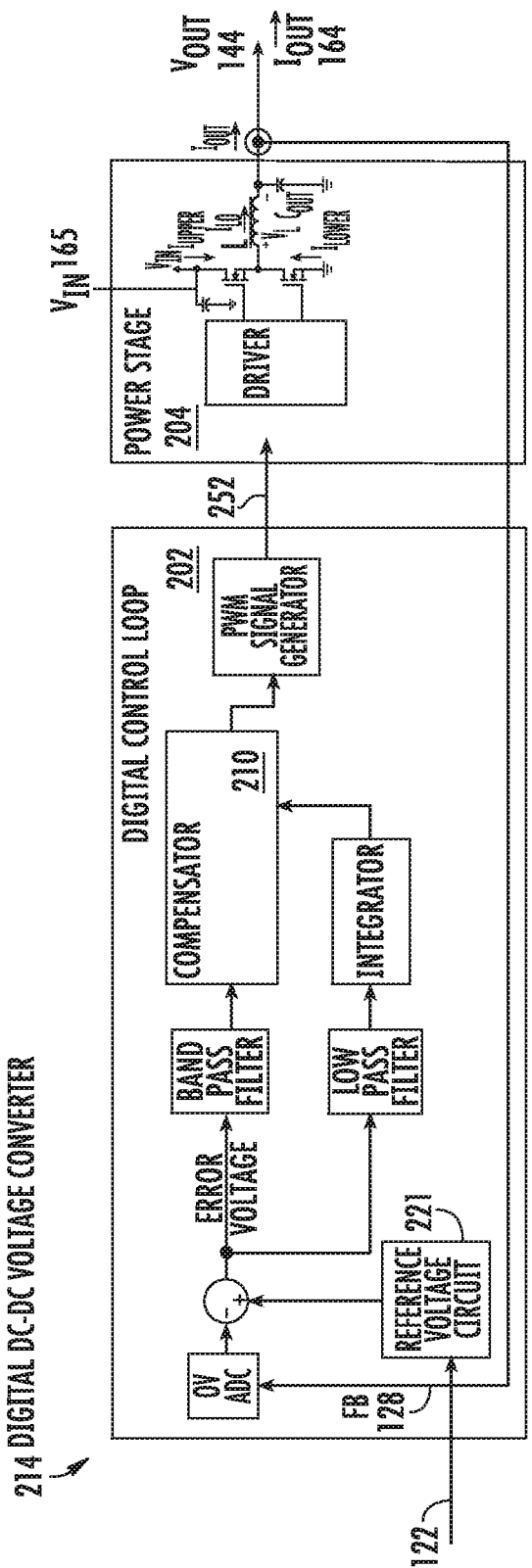
FIG. 2a illustrates an embodiment of a digital DC-DC voltage converter.

One embodiment of a digital DC-DC voltage converter 214 is illustrated in FIG. 2a. However, embodiments of the present invention can be implemented in an analog DC-DC voltage converter. The following is a summary description of the exemplary embodiment. More implementation and operational details will be later described.

The illustrated digital DC-DC voltage converter 214 has a single phase. However, embodiments of the present invention can be implemented in a multiphase DC-DC voltage converter. The digital DC-DC voltage converter 214 includes a digital control loop 202, and a power stage 204.

Each power stage 204 is provided with the input voltage 165. Each power stage 204 provides an output voltage sense signal 128, FB, e.g., a voltage signal representative of the output voltage 144, Vout, of the corresponding phase.

In one embodiment, an input of the power stage 204 is configured to receive a pulse width modulation (PWM)

signal 252 from the output of the digital control loop 202. As will be described subsequently, in one embodiment, the PWM signal 252 alternatively turns on and off upper and lower power transistors in the power stage 204.

The digital DC-DC voltage converter 214 is advantageously formed with tracking voltage noise reduction. In one embodiment, as further illustrated below, the reference circuit 221 is configured to receive the tracking voltage 122. In another embodiment, noise reduction of the tracking voltage 122 is facilitated by a reference circuit 221 in the digital control loop 202. Noise reduction of the tracking voltage 122 is accomplished by increasing the filtering of the tracking signal when the tracking voltage 122 is a substantially constant and is representative of a substantially non-zero output voltage 144 of the digital DC-DC voltage converter 214.

Particularly when the tracking voltage 122 is supplied in a single ended fashion, the tracking voltage 122 is susceptible to undesirable noise which diminishes tracking accuracy. Therefore, it is desirable to diminish such noise. Embodiments of a digital DC-DC voltage converter 214 having noise reduction of the tracking voltage 122 are subsequently described in more detail with respect to FIGS. 2b through 3.

Figure 2B:
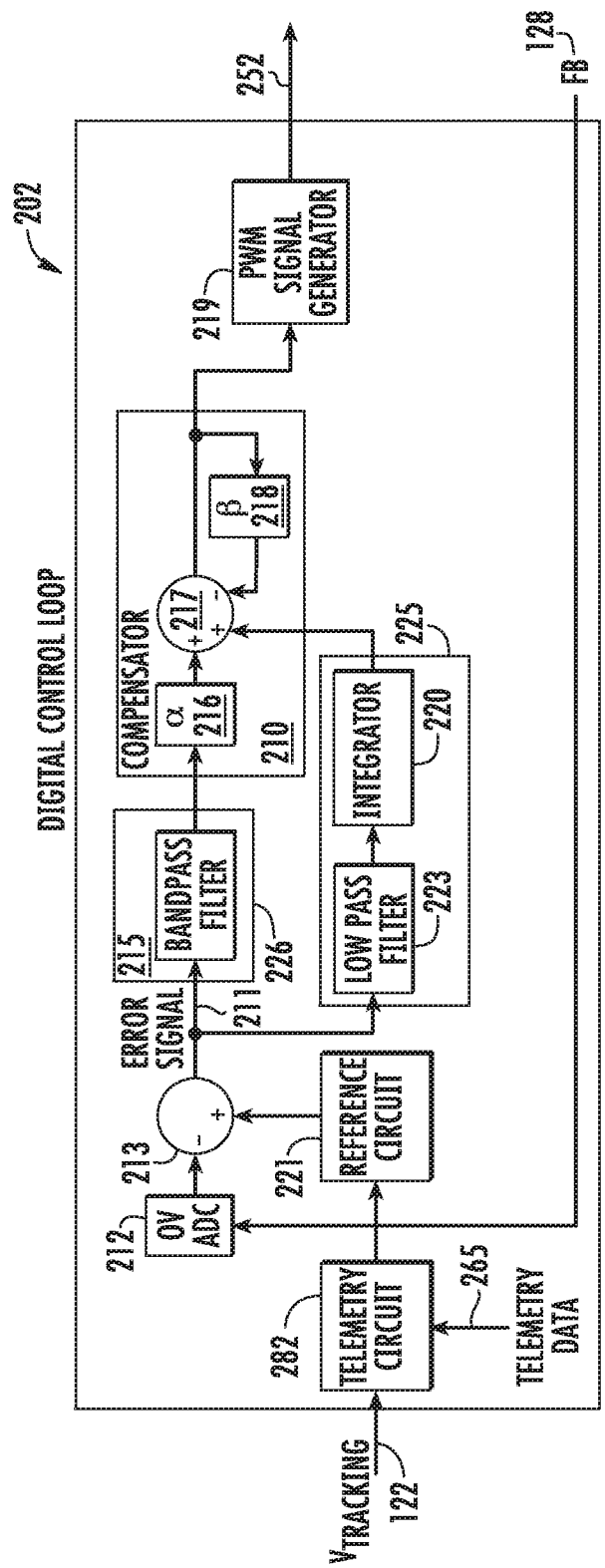
FIG. 2b illustrates an embodiment of a digital control loop.

FIG. 2b illustrates an exemplary digital control loop 202 which may be used to control one or more phases. The digital control loop 202 is configured to receive an output voltage sense signal 128. The digital control loop 202 includes an output voltage analog to digital data converter (OV ADC) 212 that converts the output voltage sense signal 128 to a digitized output voltage sense signal. An error amplifier 213, e.g. a digital subtractor, subtracts the digitized output voltage sense signal of the OV ADC 212 from an output voltage of a reference circuit 221. The error amplifier 213 generates an error signal 211, e.g. a digitized voltage. In one embodiment, the digitized voltage level of the error signal 211 is the difference between the digitized reference voltage and the digitized voltage level of the output voltage sense signal. The previously described feedback loop is intended to drive the voltage level of the output voltage sense signal 128 to the desired voltage level, a reference voltage specified by the designer or user of the power supply 102.

A telemetry circuit 282 is coupled to the reference circuit 221. The telemetry circuit 282 is conventionally used to process telemetry data 265 collected from within the digital DC-DC voltage converter 214. However, as will be subsequently described with respect to FIG. 2c, in one embodiment the telemetry circuit 282 includes an analog to digital converter (ADC) which is used to digitize telemetry data 265 and the externally provided tracking voltage 122, $V_{Tracking}$. The reference circuit 221 is configured to receive the digitized tracking voltage from the telemetry circuit 282. As will be further discussed below with respect to FIG. 2d, the digitized tracking voltage is then used to adjust the output of the reference circuit 221.

The remainder of the digital control loop 202 will now be described. A DC branch 225 and an AC branch 226 are configured to receive the error signal 211. The DC branch 225 generates a signal representative of the DC component of the error signal 211. A compensator 210 is configured to receive the output of the DC branch 225. The compensator 210 is used to compensate the digital DC-DC voltage converter 214 to recover from transient output voltage deviations. In one embodiment, the DC branch 225 is implemented by a low pass filter 223 having an output coupled to an integrator 220. For this embodiment, the input of the low pass filter 223 is configured to receive the error signal 211. The compensator 210 is configured to receive the output of the integrator 220.

The AC branch 226 generates a signal representative of the AC component of the error signal 211. In one embodiment, the AC branch 226 includes a bandpass filter 215, e.g. a ripple filter, which is configured to receive the error signal 211. The AC branch 226 removes the peak to peak signal component and harmonics of the switching frequency of the digital DC-DC voltage converter 214.

A compensator 210, e.g. a single cycle response digital compensator, is configured to receive the output of the ripple filter and the integrator 220. A single cycle response digital compensator for use in digital power management systems is further described in U.S. Pat. No. 8,575,910, which is hereby incorporated by reference.

The illustrated compensator 210 includes an alpha gain circuit 216 which is configured to receive the output of the AC branch 226, e.g. the output of the ripple filter, and multiply that signal by a gain of alpha ($\alpha$). The alpha gain circuit 216 improves the signal to noise ratio of the compensator 210 without sacrificing stability. The compensator 210 also includes a beta gain circuit 218 which is configured to receive the output of a digital summer 217, and multiply that signal by a gain of beta ($\beta$). When fed back to the digital summer 217, the feedback loop formed by the beta gain circuit 218 improves the stability of the compensator 210, and facilitates the output of the compensator 210 to reach steady state more quickly. The digital summer 217 is configured to receive the output of the alpha gain circuit 216, the output of the beta gain circuit 218, and the output of the DC branch 225, e.g. the output of the integrator 220. The output of the digital summer 217 is the summation of the output of the alpha gain circuit 216, the negative value of the output of the beta gain circuit 218, and the output of the DC branch 225, e.g. the output of the integrator 220. This is a function performed by the digital summer 217; thus a summer may be capable of mathematical manipulations, such as subtraction, in addition to addition. This function may be implemented in numerous ways. In one embodiment, the output of the beta gain circuit 218 may be subtracted from the summation of the outputs of the alpha gain circuit 216 and the DC branch 225. Alternatively, in another embodiment, the output of the alpha gain circuit 216 can be added to the difference of the outputs of the DC branch 225 and the beta gain circuit 218. In yet another embodiment, the output of the DC branch 225 can be added to the difference of the outputs of the alpha gain circuit 216 and the beta gain circuit 218.

In one embodiment, the gain of alpha gain circuit 216 and the gain of beta gain circuit 218 may be defined by the designer or user of the power supply 102. In another embodiment, the gain of alpha gain circuit 216 may range from 50 to 200, and the gain of beta gain circuit 218 may range from 0 to 1. In yet another embodiment, the gain of beta gain circuit 218 is 0.7.

A PWM signal generator 219 is configured to receive the output of the compensator 210, which in one embodiment is the output of the digital summer 217. In one embodiment, the PWM signal generator 219 multiplies, e.g. digitally, the output of the compensator 210 with a saw tooth waveform. The output of the PWM signal generator 219 is configured to provide a PWM signal 252. The PWM signal 252 has pulses of varying widths depending upon the output of the compensator 210.

Figure 2C:
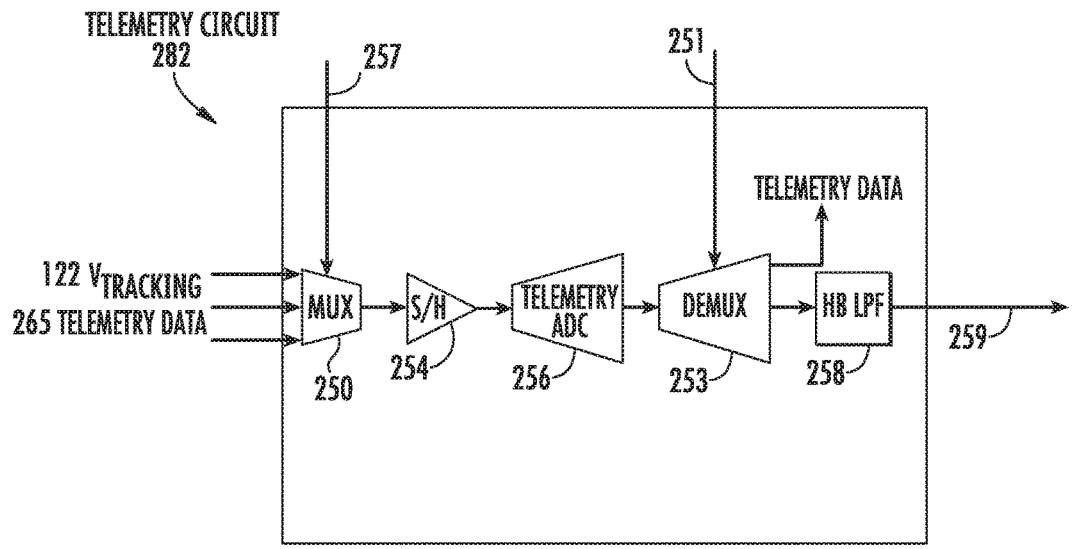
FIG. 2c illustrates an embodiment of a telemetry circuit.

An exemplary telemetry circuit 282, which is configured to provide a digitized tracking voltage to the reference circuit 221, is illustrated in FIG. 2c. The exemplary telemetry circuit 282 includes a multiplexor (MUX) 250, a sample and hold circuit (S/H) 254, a telemetry analog to digital converter (Telemetry ADC) 256, and a high bandwidth low pass filter (HB LPF) 258. The multiplexor 250 is configured to receive analog input signals including the tracking voltage 122, and one or more telemetry data 265. The multiplexor 250 has a control line 257. The multiplexor 250 is configured to transfer the tracking voltage 122 or telemetry data 265 based upon the appropriate signal being applied to the control line 257 of the multiplexor 250. In one embodiment, the signal applied to the control line 257 may be provided by the digital control loop 202; in another embodiment, the signal may be provided by the user of the power supply 102.

The sample and hold circuit 254 is configured to sample and store the output of the multiplexor 250. The telemetry ADC 256 is configured to digitize the tracking voltage 122 sampled by the sample and hold circuit 254. A demultiplexor (DMUX) 253 is configured to receive the digitized tracking voltage from the telemetry ADC 256. Upon the appropriate signal being applied to the control line 251 of the demultiplexor 253, the demultiplexor 253 is configured to provide the digitized tracking voltage to the HB LPF 258. In one embodiment, the HB LPF 258 can be implemented with a digital filter such as a first order infinite impulse response filter. In another embodiment, the ratio of the sampling frequency to the HB LPF 258 corner frequency ranges from 86.25 to 465.75. Alternatively, the signal applied to the control line 251 can command the demultiplexor 253 to provide digitized telemetry data elsewhere, e.g., in the digital control loop 202 or external to the digital DC-DC voltage converter 214. The telemetry ADC 256 may be a low resolution ADC that can introduce further noise to the digitized tracking voltage. The HB LPF 258 is configured to low pass filter the digitized tracking voltage and couple that filtered signal to the output 259 of the telemetry circuit 282. The HB LPF reduces some noise from the digitized tracking voltage. A HB LPF 258 is used because it introduces relatively low group delay.

Figure 2D:
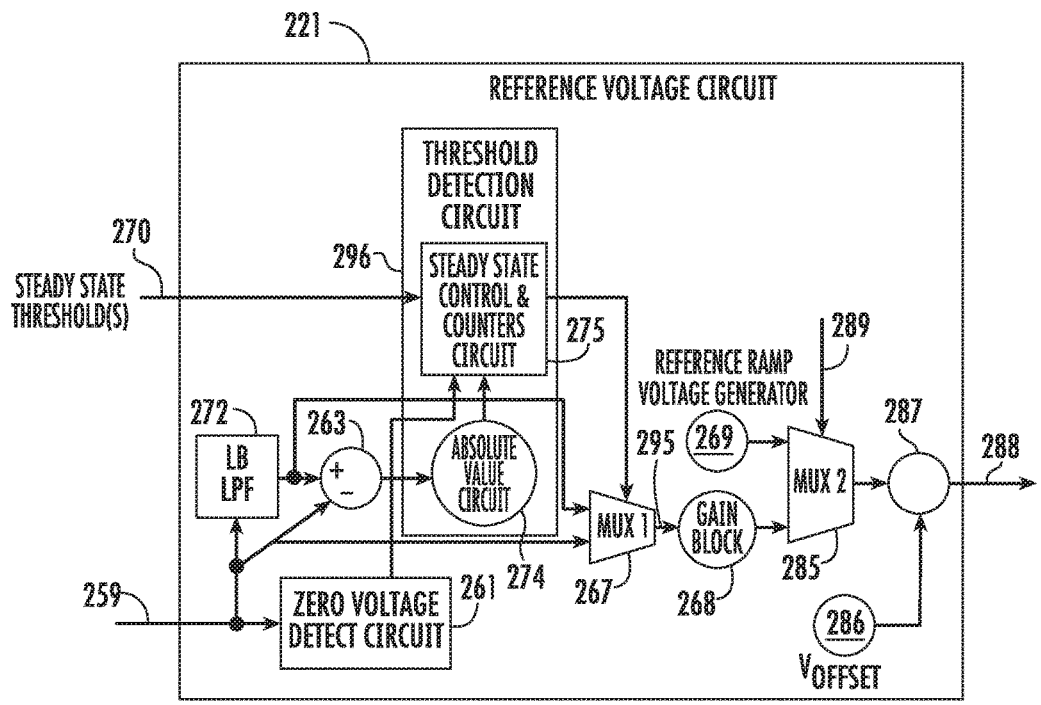
FIG. 2d illustrates an embodiment of a reference circuit.

One embodiment of the reference circuit 221, illustrated in FIG. 2d, will now be described. The reference circuit 221 is used to apply greater filtering to further remove noise from the tracking voltage 122 when the tracking voltage 122 is substantially constant, e.g. substantially in steady state. In one embodiment, such filtering is not applied when the tracking voltage 122 is representative of a zero volt output voltage 144 of the digital DC-DC voltage converter 214.

The reference circuit 221 is configured to receive the digitized and filtered tracking voltage from the output 259 of the telemetry circuit 282. The reference circuit 221 includes a zero voltage detect circuit 261, a low bandwidth low pass filter (LB LPF) 272, a first subtractor 263, a threshold detection circuit 296, a first multiplexor 267 (MUX 1), a gain block 268, a reference ramp voltage generator 269, a second multiplexor 285 (MUX 2), an offset voltage ($V_{OFFSET}$) 286, and an offset summer 287.

The LB LPF 272, first subtractor 263, and zero voltage detect circuit 261 are configured to receive the output 259 of the telemetry circuit 282. The LB LPF 272 provides additional low pass filtering to the previously low pass filtered, digitized tracking voltage, and further reduces noise in the digitized tracking voltage. The LB LPF 272 has a greater group delay then the HB LPF 258. In one embodiment, the LB LPF 272 can be implemented with a digital filter such as a first order infinite impulse response filter. In another embodiment, the ratio of the sampling frequency to the LB LPF corner frequency ranges from 465.75 to 133071.43.

The first subtractor 263 is configured to receive both the high bandwidth low pass filtered, digitized tracking voltage and the low bandwidth low pass filtered, digitized tracking voltage, subtract the former from the latter, and generate a difference voltage. The difference voltage is indicative of transitions in the voltage level of the tracking voltage 122, and substantially eliminates the contribution of undesirable high frequency noise.

The threshold detection circuit 296 is configured to receive the difference voltage generated by the first subtractor 263 and one or more steady state threshold(s) 270, e.g. a voltage. The threshold detection circuit 296 determines whether the digital value of the difference voltage is within upper and lower bounds defined by one or more steady state thresholds, e.g. defined by the designer or user of the power supply 102.

In one embodiment, the threshold detection circuit 296 is includes an absolute value circuit 274 and a steady state control and counters circuit 275. The absolute value circuit 274 is configured to receive the digital value of the difference voltage generated by the first subtractor 263, and to generate the absolute value of the difference voltage.

The steady state control and counters circuit 275 is configured to receive the digital absolute value of the difference voltage, an output of the zero voltage detect circuit 261, and a steady state threshold 270, e.g. digitized voltage. The output of the zero voltage detect circuit 261 indicates when the digitized, high bandwidth filtered tracking voltage is representative of a substantially zero volt output voltage 144 of the digital DC-DC voltage converter 214. In one embodiment, such a representative tracking voltage is zero volts. In this event, even if the tracking voltage 122 is representative of a steady state, substantially zero volt output voltage 144 of the digital DC-DC voltage converter 214, the steady state control and counters circuit 275 will operate as if the tracking voltage 122 is not in steady state; thus the digitized, HB LPF tracking voltage will be provided to the input of the gain block 268.

The first multiplexor 267 is configured to receive the output of the threshold detection circuit 296 (e.g. the output of the steady state control and counters circuit 275), the digitized, LB LPF tracking voltage, and the digitized HB LPF tracking voltage. The output of the threshold detection circuit 296 (e.g. the steady state control and counters circuit 275) controls whether the first multiplexor 267 outputs the digitized, LB LPF tracking voltage, or the digitized HB LPF tracking voltage. The output voltage of the first multiplexor 267 may be referred to as the output tracking voltage 295.

In one embodiment, the steady state threshold 270, e.g. voltage, is a level that is just above the noise floor of the first subtractor 263. In another embodiment, when the amplitude of the difference voltage is within upper and lower bounds, e.g. the absolute value of the difference voltage is less than the steady state threshold 270, then the tracking voltage 122 has entered steady state. Then, after a period of time, e.g. greater than zero counts, if the tracking voltage 122 remains in steady state, the threshold detection circuit 296 commands the first multiplexor 267 to output the digitized LB LPF tracking voltage.

When the difference voltage falls outside the upper or lower bounds, the tracking voltage 122 has exited steady state. Then, after a period of time, e.g. greater than zero counts, if the tracking voltage 122 continues to be no longer in steady state, e.g. the absolute value of the difference voltage remains greater than the steady state threshold 270, then the threshold detection circuit 296 commands the first multiplexor 267 to output the digitized HB LPF tracking voltage. In one embodiment, to avoid missing transients in the digitized tracking voltage, the time period for determining whether the tracking voltage 122 has exited steady state is less than the time period for determining whether the tracking voltage 122 has entered steady state.

The operation of the exemplary embodiment of the threshold detection circuit 296 will also be described. When the absolute value of the difference voltage becomes less than the steady state threshold 270, the tracking voltage 122 has entered steady state. Then, after a period of time, e.g. greater than zero counts, if the tracking voltage 122 remains in steady state, e.g. the absolute value of the difference voltage remains less than the steady state threshold 270, then steady state control and counters circuit 275 commands the first multiplexor 267 to output the digitized LB LPF tracking voltage.

When the absolute value of the difference voltage becomes greater than the steady state threshold 270, the tracking voltage 122 has exited steady state. Then, after a period of time, e.g. greater than zero counts, if the tracking voltage 122 continues to be no longer in steady state, e.g. the absolute value of the difference voltage remains greater than the steady state threshold 270, then steady state control and counters circuit 275 commands the first multiplexor 267 to output the digitized HB LPF tracking voltage. In one embodiment, to avoid missing transients, the time period for determining whether the tracking voltage 122 has exited steady state is less than the time period for determining whether the tracking voltage 122 has entered steady state.

In another embodiment, rather than discretely switching between the digitized HB and LB LPF tracking voltages, processing circuitry can be implemented in lieu of the first multiplexor 267 to facilitate the smooth transition between the two voltages, e.g. using a ramp function or an interpolator. In one embodiment, in the case of the ramp function, the processing circuitry would incrementally increase or decrease the filtered tracking voltage by the minimum digitization resolution to transition between the digitized HB and LB LPF tracking voltages. In another embodiment, in the case of the interpolator, the processing circuitry would linearly or non-linearly interpolate a set of intermediate tracking voltage values, and transition through such values between the digitized HB and LB LPF tracking voltages.

The gain block 268 is configured to receive the output of the first multiplexor 267. In one embodiment, the gain block 268 scales the amplitude of the digitized and filtered tracking voltage so that the telemetry ADC 256 and OV ADC 212 have effectively equivalent reference voltages.

A second multiplexor 285 is configured to receive the output of the gain block 268, the reference ramp voltage generator 269, and a second multiplexor control signal 289. The second multiplexor control signal 289 commands the second multiplexor 285 to output either the output of the gain block 268, or the output of the reference ramp voltage generator 269, e.g. in the event no tracking voltage 122 is used.

The reference ramp voltage generator 269 is used to provide a reference voltage which may ramped from a lower voltage, e.g. zero volts, to the reference voltage. In one embodiment, the reference voltage is representative of the desired output voltage, or a voltage proportional to the desired output voltage, of the digital DC-DC voltage converter 214. In one embodiment, the reference voltage and corresponding ramp rate are determined by the designer or user of the power supply 102. In another embodiment, the second multiplexor control signal 289 is implemented by the designer of the power supply 102, e.g. to implement the aforementioned systems using a tracking voltage 122.

The offset summer 287 is configured to receive and sum the output of the second multiplexor 285 and an offset voltage 286. The digital offset voltage can be used, e.g. to compensate for offset voltages elsewhere in the digital DC-DC voltage converter 214.

Figure 2E:
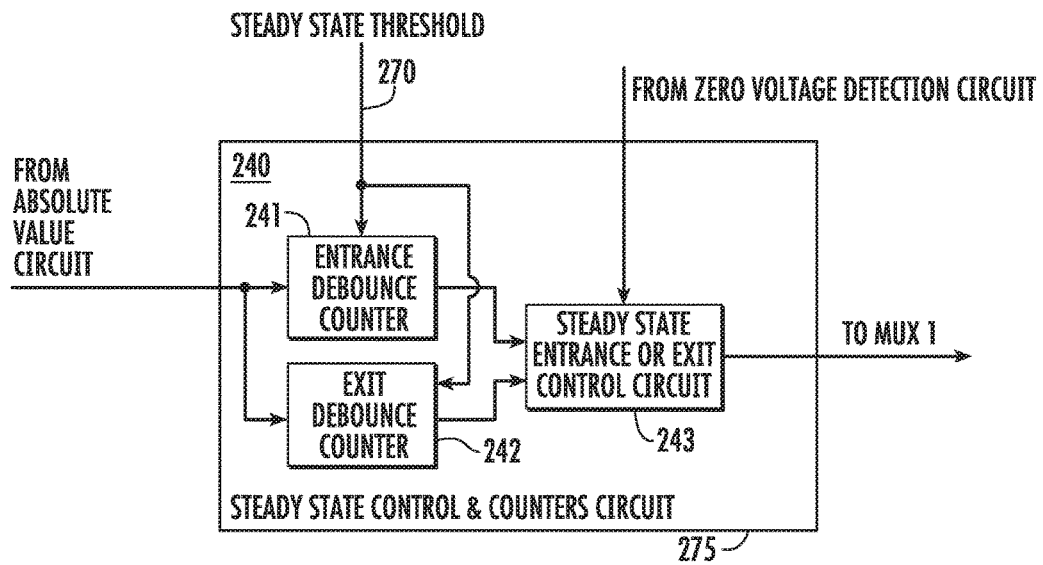
FIG. 2e illustrates an embodiment of a steady state control and counters circuit.

FIG. 2e illustrates one embodiment of the steady state control and counters circuit 275 which includes an entrance debounce counter 241, exit debounce counter 242, and a steady state entrance or exit control circuit 243. The entrance debounce counter 241 and the exit debounce counter 242 are each configured to receive the output from the absolute value circuit 274 and the steady state threshold 270. In one embodiment, by default the output of the first multiplexor 267 is controlled to provide the high bandwidth low pass filtered tracking voltage to the gain block 268.

If the output voltage of the absolute value circuit 274 initially becomes less than the steady state threshold 270, the entrance debounce counter 241 begins counting for a number of cycles as described above. Upon finishing the count, if the output voltage of the absolute value circuit 274 has remained less than the steady state threshold 270, and the tracking voltage 122 is not representative of a substantially zero volt output voltage 144 of the digital DC-DC voltage converter 214, then the entrance debounce counter 241 commands the steady state entrance or exit control circuit 243 to direct the first multiplexor 267 to provide the low bandwidth low pass filtered tracking voltage to the gain block 268.

Similarly, if the output voltage of the absolute value circuit 274 initially exceeds the voltage level of the steady state threshold 270, then the exit debounce counter 242 begins counting for a number of cycles as described above. Upon finishing the count, if the output voltage of the absolute value circuit 274 has remained greater than the voltage level of the steady state threshold 270, the exit debounce counter 242 commands the steady state entrance or exit control circuit 243 to direct the first multiplexor 267 to provide the high bandwidth low pass filtered tracking voltage to the gain block 268.

Figure 2F:
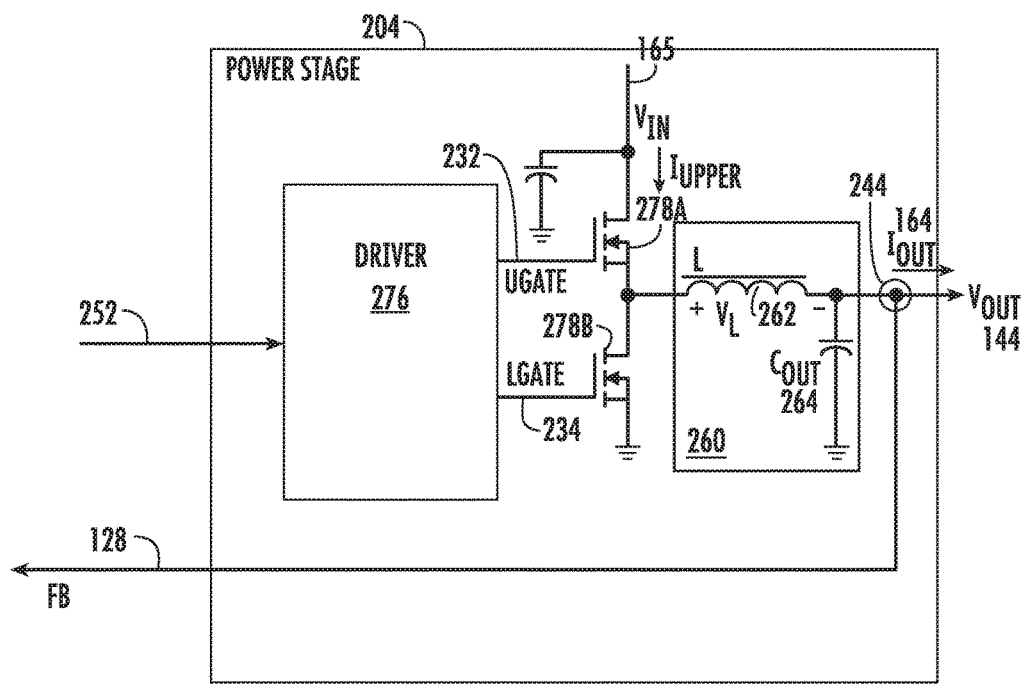
FIG. 2f illustrates an embodiment of a power stage.

FIG. 2f illustrates one embodiment of a power stage 204. The power stage 204 includes a driver 276, power transistor(s), e.g. upper metal oxide semiconductor field effect transistor ('MOSFET') 278A and a lower MOSFET 278B, and an output filter 260. The driver 276 is configured to receive the PWM signal 252 from the digital control loop 202. The driver 276 generates a UGate control signal 232 and an LGate control signal 234 that are respectively coupled to inputs of the upper MOSFET 278A and the lower MOSFET 278B. UGate control signal 232 and an LGate control signal 234 cause respectively the upper MOSFET 278A and the lower MOSFET 278B to alternatively switch on and off. In one embodiment, the driver 276 may include dead time control and bootstrapping. The output filter 260 may include a series inductor 262 and shunt capacitor 264. In one embodiment, the output filter 260 is coupled between a voltage sensor 244, and a node of both of the upper MOSFET 278A and the lower MOSFET 278B. The power stage 204 output has a corresponding output voltage 144, $V_{OUT}$, and output current 164, $I_{OUT}$.

In one embodiment, the voltage sensor 244 is coupled to the output of the power stage 204. The voltage sensor 244 generates an output voltage sense signal 128, FB, representative of the output voltage 144. The output voltage sense signal 128 may communicate information about the output voltage 144 by varying its voltage or current level.

In one embodiment, the upper MOSFET 278A and the lower MOSFET 278B are powered by the power supply 102. In another embodiment, the power supply 102 provides an input voltage 165, $V_{IN}$, which is coupled to the drain of the upper MOSFET 278A. In yet a further embodiment, the input voltage 165 is a direct current ('DC') voltage provided by the power supply 102.

In one embodiment, the digital control loop 202, driver 276 and at least one power transistor are fabricated on a single integrated circuit ('IC'). Alternatively, the digital control loop 202, digital current share control circuit 206 (if required), and driver 276 may be fabricated on a single integrated circuit that does not include any power transistors. In another embodiment, the digital control loop 202 and the digital current share control circuit 206 (if required) may be fabricated on a single IC; the driver 276 and at least one power transistor may be fabricated on one or more separate ICs. In a further embodiment, the upper MOSFET 278A and the lower MOSFET 278B may be fabricated on a single IC.

Figure 3:
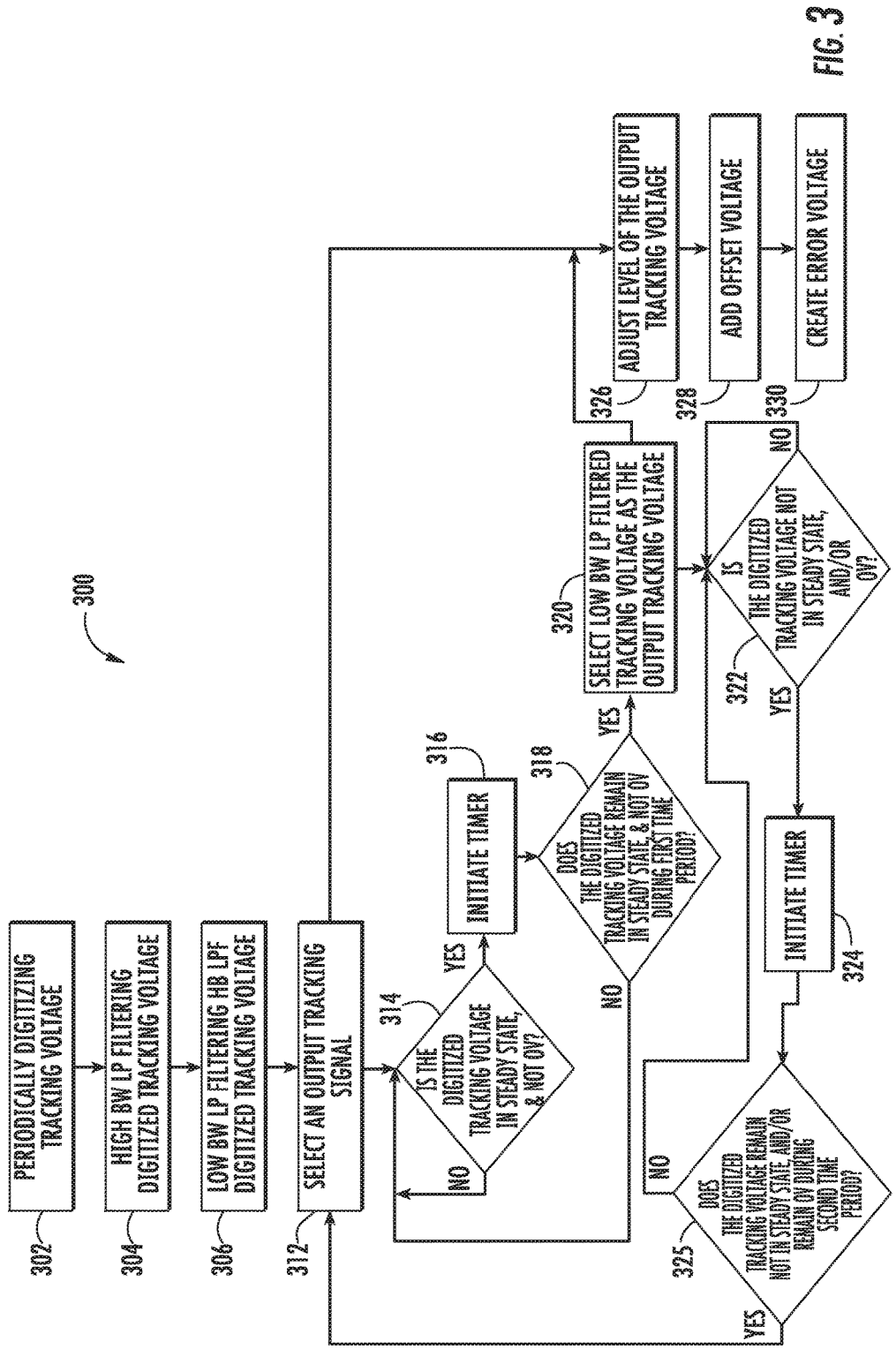
FIG. 3 illustrates one embodiment of operation of a digital DC-DC converter using a tracking voltage.

One embodiment of a method of operation 300 of the DC-DC voltage converter 104 set forth above will now be described, as further illustrated in FIG. 3. In block 302, the tracking voltage is periodically digitized; such periodic digitizing can occur at regular or irregular intervals. In block 304, the digitized tracking voltage is high bandwidth low pass filtered which in one embodiment is the default selected digitized tracking voltage. In block 306, the digitized tracking voltage is low bandwidth low pass filtered. In block 312, an output tracking voltage 295 is selected, e.g. the high bandwidth, low pass filtered digitized tracking voltage. Then two blocks follow: blocks 326 and block 314. Block 314 shall now be described. Block 326 shall be described later.

In block 314, determine if the digitized tracking voltage is in steady state, and if the amplitude of the digitized tracking voltage is not representative of a substantially zero volt output voltage 144 of the DC-DC voltage converter 104, e.g. greater than substantially zero volts. In another embodiment, whether the digitized tracking voltage is in steady state can be determined by ascertaining if the difference between the amplitudes of low bandwidth, low pass filtered digitized tracking voltage and the high bandwidth, low pass filtered digitized tracking voltage is within upper and lower thresholds. One example of this is further illustrated below with regard to FIG. 4.

If the digitized tracking voltage is not in steady state and/or if the amplitude of the digitized tracking voltage is not representative of a substantially zero volt output voltage 144, repeat block 314 of the DC-DC voltage converter 104. If the digitized tracking voltage is in steady state, and if the amplitude of the digitized tracking voltage is not representative of a substantially zero volt output voltage 144 of the DC-DC voltage converter 104, e.g. greater than substantially zero volts, then in block 316, initiate a timer of a first time period. In block 318, determine, during the first time period, if the digitized tracking voltage is in steady state, and if the amplitude of the digitized tracking voltage is not representative of a substantially zero volt output voltage 144 of the DC-DC voltage converter 104. If, during the first time period, the digitized tracking voltage no longer remains in steady state and/or if the amplitude of the digitized tracking voltage becomes representative of a substantially zero volt output voltage 144 of the DC-DC voltage converter 104, then repeat block 314. If, during the first time period, the digitized tracking voltage remains in steady state, and if the amplitude of the digitized tracking voltage remains not representative of a substantially zero volt output voltage 144 of the DC-DC voltage converter 104, then in block 320 the low bandwidth, low pass filtered digitized tracking voltage is selected as the output tracking voltage 295 (i.e. effectively increasing the low pass filtering of the digitized tracking voltage). Then two blocks follow: block 326 and block 322. Block 322 shall now be described. Block 326 shall be described later.

In block 322, determine if the digitized tracking voltage is not in steady state and/or if the amplitude of the digitized tracking voltage is representative of a substantially zero volt output voltage 144 of the DC-DC voltage converter 104. If the digitized tracking voltage is in steady state and the amplitude of the digitized tracking voltage is not representative of a substantially zero volt output voltage 144 of the DC-DC voltage converter 104, then repeat block 322. If the digitized tracking voltage is not in steady state and/or if the amplitude of the digitized tracking voltage is representative of a substantially zero volt output voltage 144 of the DC-DC voltage converter 104, then initiate a timer of a second time period at block 324. The first and second time periods may be the same or different. During the second time period, determine if the digitized tracking voltage remains not in steady state and/or if the amplitude of the digitized tracking voltage remains representative of a substantially zero volt output voltage 144 of the DC-DC voltage converter at block 325. If during the second time period, the digitized tracking voltage enters steady state and the amplitude of the digitized tracking voltage is not representative of a substantially zero volt output voltage 144 of the DC-DC voltage converter 104, then repeat block 322. If during the second time period, the digitized tracking voltage remains not in steady state and/or if the amplitude of the digitized tracking voltage remains representative of a substantially zero volt output voltage 144 of the DC-DC voltage converter 104, then return to block 312, select the high bandwidth, low pass filtered digitized tracking voltage as the output tracking voltage 295, and proceed to blocks 314 and 326.

In block 326, adjust the amplitude of the output tracking voltage 295, e.g. to scale by multiplication or division the amplitude of the output tracking voltage 295. In block 328, add an offset voltage 286 to the adjusted output tracking voltage. Blocks 326 and 328 modify the amplitude of the output tracking voltage. In block 330, create an error voltage by subtracting the digitized voltage level of the output voltage sense signal 128 from the offset, adjusted output tracking voltage.

Figure 4:
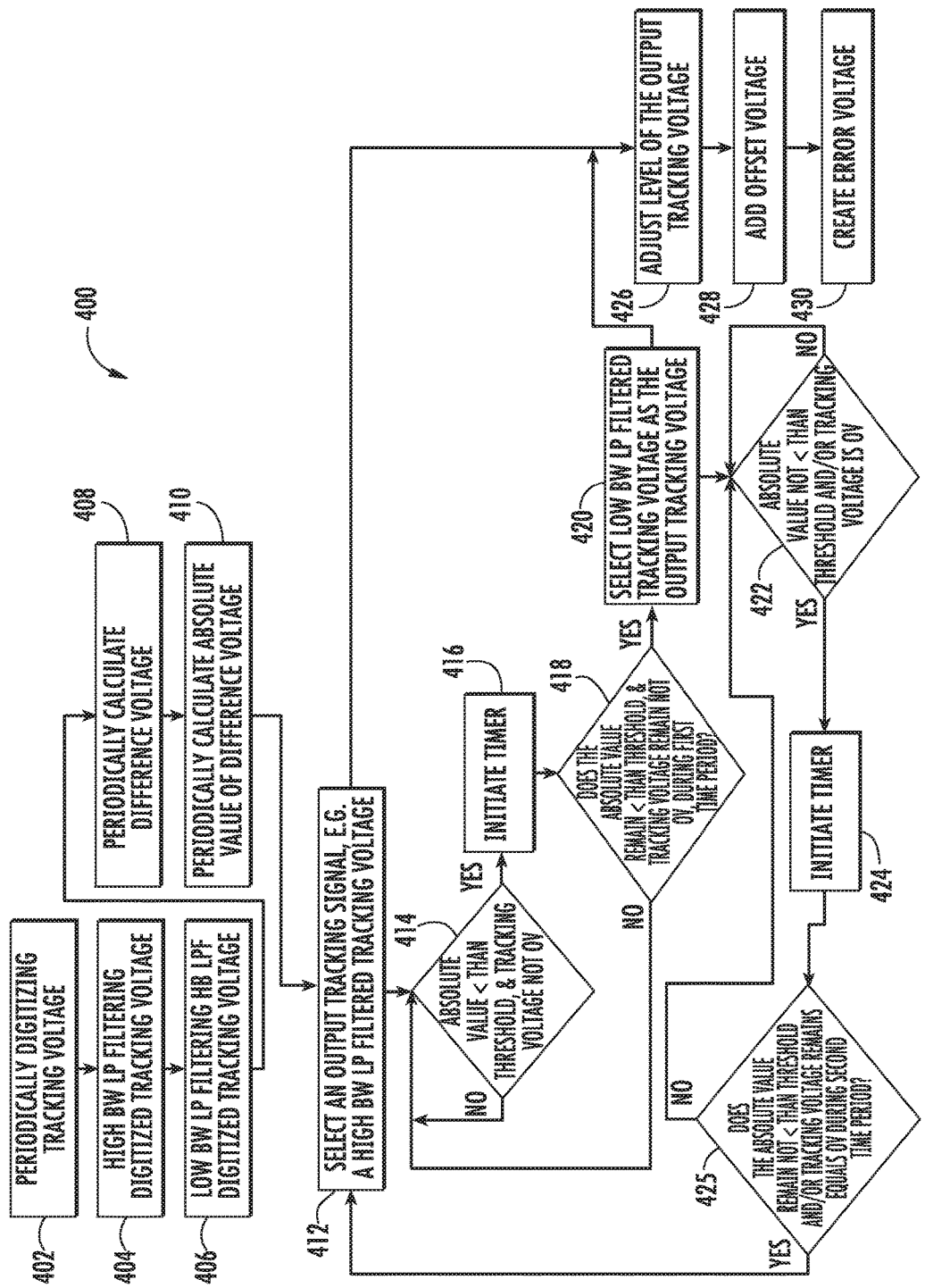
FIG. 4 illustrates another embodiment of the operation of a digital DC-DC converter using a tracking voltage.

Another embodiment of a method of operation 400 of the DC-DC voltage converter 104 set forth above will now be described, as further illustrated in FIG. 4. In this embodiment, an exemplary means of ascertaining whether the tracking voltage 122 is in steady state is described.

In block 402, the tracking voltage is periodically digitized; periodically digitizing can occur at regular or irregular intervals. In block 404, the digitized tracking voltage is high bandwidth, low pass filtered which is the default selected digitized tracking voltage. In block 406, the digitized tracking voltage is low bandwidth, low pass filtered. In block 408, a difference voltage is periodically calculated by subtracting the amplitude of the high bandwidth low pass filtered, digitized tracking voltage from the amplitude of the low bandwidth low pass filtered, digitized tracking voltage. In block 410, the absolute value of the amplitude of the difference voltage is periodically calculated. In block 412, select an output tracking voltage 295, e.g. the high bandwidth, low pass filtered digitized tracking voltage. Then two blocks follow: blocks 426 and block 414. Block 414 shall now be described. Block 426 shall be described later.

In block 414, determine if the absolute value of the amplitude of the difference voltage is less than a threshold voltage, and if the amplitude of the digitized tracking voltage is not representative of a substantially zero volt output voltage 144 of the DC-DC voltage converter 104. If the absolute value of the amplitude of the difference voltage is not less than the threshold voltage and/or the amplitude of the digitized tracking voltage is representative of a substantially zero volt output voltage 144 of the DC-DC voltage converter 104, repeat block 414. If the absolute value of the amplitude of the difference voltage is less than the threshold voltage and the amplitude of the digitized tracking voltage is not representative of an output voltage 144 of the DC-DC voltage converter 104, then, in block 416, initiate a timer of a first time period. In block 418, determine, during the first time period, if the amplitude of the absolute value of the difference voltage is less than the threshold and if the amplitude of the digitized tracking voltage is not representative of a zero volt output voltage 144 of the DC-DC voltage converter 104. If, during the first time period, the amplitude of the absolute value of the difference voltage no longer remains less than the threshold voltage and/or the amplitude of the digitized tracking voltage is representative of a substantially zero volt output voltage 144 of the DC-DC voltage converter 104, then repeat block 414. If, during the first time period, the amplitude of the absolute value of the difference voltage remains less than the threshold voltage and the amplitude of the digitized tracking voltage is not representative of a substantially zero volt output voltage 144 of the DC-DC voltage converter 104, then in block 420 select the low bandwidth, low pass filtered digitized tracking voltage as the output tracking voltage 295 (i.e. effectively increasing the low pass filtering of the digitized tracking voltage). Then two blocks follow: block 426 and block 422. Block 422 shall now be described. Block 426 shall be described later.

In block 422, determine if the amplitude of the absolute value of the difference voltage is not less than the threshold voltage and/or if the amplitude of the digitized tracking voltage is representative of a substantially zero output voltage 144 of the DC-DC voltage converter 104. If the amplitude of the absolute value of the difference voltage remains less than the threshold voltage and the amplitude of the digitized tracking voltage is not representative of a substantially zero volt output voltage 144 of the DC-DC voltage converter 104, then repeat block 422. If the amplitude of the absolute value of the difference voltage is not less than a threshold voltage and/or if the amplitude of the digitized tracking voltage is representative of a substantially zero volt output voltage 144 of the DC-DC voltage converter 104, then initiate a timer of a second time period at block 424. The first and second time periods may be the same or different. During the second time period, determine if the amplitude of the absolute value of the difference voltage remains not less than the threshold voltage and/or if the amplitude of the digitized tracking voltage remains representative of a substantially zero volt output voltage 144 of the DC-DC voltage converter 104 at block 425. If during the second time period, the amplitude of the absolute value of the difference voltage becomes less than the threshold voltage and amplitude of the digitized tracking voltage is not representative of a substantially zero volt output voltage 144 of the DC-DC voltage converter 104, then repeat block 422. If the amplitude of the absolute value of the difference voltage remains not less than the threshold voltage and/or the amplitude of the digitized tracking voltage remains not representative of a substantially zero volt output voltage 144 of the DC-DC voltage converter 104, then return to block 412, select the high bandwidth, low pass filtered digitized tracking voltage as the output tracking voltage 295, and proceed to block 426.

In block 426, adjust the voltage level of the output tracking voltage 295, e.g. to scale the amplitude of the digitized and filtered tracking voltage. In block 428, add an offset voltage 286 to the adjusted, output tracking voltage. In block 430, create an error voltage by subtracting the digitized voltage level of the output voltage sense signal 128 from the offset, adjusted output tracking voltage.

Although only a DC-DC buck converter was described herein, the invention may be implemented in other DC-DC voltage converter 104 topologies, including without limitation boost converters and buck-boost converters.

EXAMPLE EMBODIMENTS

Example 1 includes an apparatus, comprising a control loop configured to receive an output voltage sense signal; and wherein the control loop further comprises: a compensator; a PWM signal generator coupled to an output of the compensator; a reference circuit configured to receive a tracking signal, and which is configured to low bandwidth low pass filter the tracking signal when the tracking signal amplitude becomes substantially constant and representative of an output voltage that is substantially non-zero; and an error amplifier having a first input coupled to an output of the reference circuit, a second input configured to receive the output voltage sense signal, and an output coupled to the compensator.

Example 2 includes the apparatus of Example 1, wherein the control loop further comprises a telemetry circuit configured to receive the tracking signal, and having an output coupled to the reference circuit.

Example 3 includes the apparatus of Example 1, wherein the reference circuit comprises: a low bandwidth low pass filter (LB LPF) configured to low bandwidth low pass filter the tracking signal; a zero voltage detect circuit configured to receive the tracking signal; a subtractor configured to subtract a low bandwidth low pass filtered tracking signal from the tracking signal; a threshold detection circuit configured to receive the output of the zero voltage detect circuit, an output of the subtractor and at least one steady state threshold; and a first multiplexor configured to receive an output of the threshold detection circuit, the tracking signal, and the low bandwidth low pass filtered tracking signal.

Example 4 includes the apparatus of Example 3, wherein the control loop further includes a high bandwidth low pass filter (HB LPF) to filter the tracking signal, and which is configured to provide the tracking signal to the zero voltage detect circuit, the subtractor and the first multiplexor.

Example 5 includes the apparatus of Example 4, wherein the threshold detection circuit comprises: a steady state control and counters circuit configured to receive the output of the zero voltage detect circuit, and at least one steady state threshold, and having an output coupled to the first multiplexor; and an absolute value circuit having an output coupled to the steady state control and counters circuit, and coupled to an output of the subtractor.

Example 6 includes the apparatus of Example 5, wherein the steady state control and counters circuit comprises: an entrance debounce counter having an input coupled to the output of the absolute value circuit, and configured to receive at least one steady state threshold; an exit debounce counter having an input coupled to the output of the absolute value circuit, and configured to receive at least one steady state threshold; and a steady state entrance or exit control circuit coupled to an input of the first multiplexor, an output of the entrance debounce counter, an output of the exit debounce counter, the output of the zero voltage detection circuit.

Example 7 includes the apparatus of Example 3, further comprising a second multiplexor coupled to an output of the first multiplexor, and a reference ramp voltage generator.

Example 8 includes the apparatus of Example 7, further comprising a gain block coupled between the output of the first multiplexor and an input of the second multiplexor.

Example 9 includes the apparatus of Example 8, further comprising: an offset voltage; and a summer coupled to the offset voltage and an output of the second multiplexor.

Example 10 includes the apparatus of Example 2, wherein the telemetry circuit further comprises: a third multiplexor configured to receive the tracking signal and telemetry data; a sample and hold circuit coupled to an output of the third multiplexor; a telemetry analog to digital converter (ADC) coupled to an output of the sample and hold circuit; and a demultiplexor coupled to an output of the telemetry ADC.

Example 11 includes the apparatus of Example 1, further comprising: an AC branch coupled between the output of the error amplifier and a first input of the compensator; and a DC branch coupled between the output of the error amplifier and a second input of the compensator.

Example 12 includes the apparatus of Example 11, wherein the AC branch comprises a bandpass filter, and the DC branch comprises an integrator.

Example 13 includes the apparatus of Example 11, wherein the compensator comprises: an alpha gain circuit having an input coupled to the first input of the compensator; a beta gain circuit having an input coupled to an output of the compensator; and a summer having an first input coupled to an output of the alpha gain circuit, and a second input coupled to the second input of the compensator, a third input coupled to an output of the beta gain circuit.

Example 14 includes the apparatus of Example 1, further comprising a power stage coupled to an output of the PWM signal generator; and wherein the power stage is configured to provide the output voltage sense signal and the output voltage.

Example 15 includes the apparatus of Example 14, wherein the power stage further comprises: a driver having an input coupled to an output of the control loop; at least one power transistor having an input coupled to an output of the driver; and a filter having an input coupled to an output of the at least one power transistor.

Example 16 includes a system, comprising: a control loop further comprising: a compensator; a PWM signal generator coupled to an output of the compensator and configured to generate a PWM signal; a reference circuit configured to receive a tracking signal, and which is configured to low bandwidth low pass filter the tracking signal when an amplitude of the tracking signal becomes substantially constant and representative of an output voltage that is substantially non-zero; and an error amplifier having a first input coupled to an output of the reference circuit, a second input configured to receive an output voltage sense signal, and an output coupled to the compensator; a power stage configured to receive the PWM signal, and configured to generate the output voltage sense signal; and a load coupled to an output of the power stage.

Example 17 includes the system of Example 16, wherein the load comprises a processing system coupled to an output of the power stage.

Example 18 includes the system of Example 16, wherein the reference circuit comprises:
a low bandwidth low pass filter (LB LPF) configured to low bandwidth low pass filter the tracking signal; a zero voltage detect circuit configured to receive the tracking signal; a subtractor configured to subtract a low bandwidth low pass filtered tracking signal from the tracking signal; a threshold detection circuit configured to receive an output of the zero voltage detect circuit, an output of the subtractor and at least one steady state threshold; and a first multiplexor configured to receive the output of the threshold detection circuit, the tracking signal, and the low bandwidth low pass filtered tracking signal.

Example 19 includes the system of Example 16, wherein the control loop further comprises a telemetry circuit configured to receive the tracking signal, and having an output coupled to the reference circuit.

Example 20 includes a method for operating a DC-DC voltage converter, comprising: determining whether a tracking signal has entered steady state, and an output voltage of the DC-DC voltage converter is substantially non-zero; if the tracking voltage has entered steady state and an output voltage is substantially non-zero, then filter the tracking signal; and calculating a difference between an amplitude of the output tracking signal and a signal representative of the output voltage.

Example 21 includes the method of Example 20, further comprising: low bandwidth, low pass filtering the tracking signal; selecting an output tracking signal; wherein determining whether a tracking voltage has entered steady state, and an output voltage of the DC-DC voltage converter is substantially non-zero further comprises: determining if the tracking signal is in steady state and if an amplitude of the tracking signal is not equal to substantially a first threshold level representative of a zero volt output voltage of the DC-DC voltage converter; and wherein if the tracking voltage has entered steady state and an output voltage is substantially non-zero, increase the filtering of the tracking voltage further comprises: if the tracking signal is in steady state and if the amplitude of the tracking signal is not substantially equal to the first threshold level, then initiate a first timer having a first time period; if during the first time period, the tracking signal remains in steady state and if the amplitude of the tracking signal remains not substantially equal to the first threshold level, then select a low bandwidth, low pass filtered tracking signal as the output tracking signal.

Example 22 includes the method of Example 21, further comprising: upon selecting the low bandwidth, low pass filtered tracking signal as the output tracking signal, if at least one of (a) the tracking signal is not in steady state and (b) the amplitude of the tracking signal is substantially equal to the first threshold level, then initiate a second timer having a second time period; and if during the second time period, if at least one of (a) the tracking signal is not in steady state and (b) the amplitude of the tracking signal remains substantially equal to the first threshold level, then select the high bandwidth, low pass filtered tracking signal as the output tracking signal.

Example 23 includes the method of Example 20, further comprising modifying the amplitude of the output tracking voltage.

Example 24 includes the method of Example 20, further comprising high bandwidth, low pass filtering the tracking signal.

Example 25 includes the method of Example 24, wherein selecting the output tracking signal further comprises selecting the output tracking signal that is the high bandwidth low pass filtered tracking signal.

Example 26 includes the method of claim 20, further comprising digitizing the tracking signal.

It will be evident to one of ordinary skill in the art that the processes and resulting apparatus previously described can be modified to form various apparatuses having different circuit implementations and methods of operation. Notwithstanding that the numerical ranges and parameters setting forth the broad scope of the present teachings are approximations, the numerical values set forth in the specific examples are reported as precisely as possible. Signal levels and generators herein are exemplified with reference to voltage or current. However, those skilled in the art understand that a voltage signal or a voltage generator can respectively be implemented with current signals and current generators, or vice versa. Therefore, such signals may also be referred herein as signals or thresholds rather than voltages and current. Correspondingly, voltage and current generators may be referred to as generators.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the methods and structures disclosed herein. It is intended that the specification and examples be considered as exemplary only, with a true scope and spirit of the present teachings being indicated by the following claims.

What is claimed is:

1. An apparatus, comprising:
   a control loop configured to receive an output voltage sense signal; and
   wherein the control loop further comprises:
   a compensator;
   a PWM signal generator coupled to an output of the compensator;
   a reference circuit configured to receive a tracking signal, and which is configured to low bandwidth low pass filter the tracking signal when the tracking signal amplitude becomes substantially constant and representative of an output voltage that is substantially non-zero; and
   an error amplifier having a first input coupled to an output of the reference circuit, a second input configured to receive the output voltage sense signal, and an output coupled to the compensator.

2. The apparatus of claim 1, wherein the control loop further comprises a telemetry circuit configured to receive the tracking signal, and having an output coupled to the reference circuit.

3. The apparatus of claim 1, wherein the reference circuit comprises:
   a low bandwidth low pass filter (LB LPF) configured to low bandwidth low pass filter the tracking signal;
   a zero voltage detect circuit configured to receive the tracking signal;
   a subtractor configured to subtract a low bandwidth low pass filtered tracking signal from the tracking signal;
   a threshold detection circuit configured to receive the output of the zero voltage detect circuit, an output of the subtractor and at least one steady state threshold; and
   a first multiplexor configured to receive an output of the threshold detection circuit, the tracking signal, and the low bandwidth low pass filtered tracking signal.

4. The apparatus of claim 1, further comprising:
   an AC branch coupled between the output of the error amplifier and a first input of the compensator; and
   a DC branch coupled between the output of the error amplifier and a second input of the compensator.

5. The apparatus of claim 1, further comprising a power stage coupled to an output of the PWM signal generator; and wherein the power stage is configured to provide the output voltage sense signal and the output voltage.

6. The apparatus of claim 2, wherein the telemetry circuit further comprises:
   a third multiplexor configured to receive the tracking signal and telemetry data;
   a sample and hold circuit coupled to an output of the third multiplexor;
   a telemetry analog to digital converter (ADC) coupled to an output of the sample and hold circuit; and a demultiplexor coupled to an output of the telemetry ADC.

7. The apparatus of claim 3, wherein the control loop further includes a high bandwidth low pass filter (HB LPF) to filter the tracking signal, and which is configured to provide the tracking signal to the zero voltage detect circuit, the subtractor and the first multiplexor.

8. The apparatus of claim 3, further comprising a second multiplexor coupled to an output of the first multiplexor, and a reference ramp voltage generator.

9. The apparatus of claim 4, wherein the AC branch comprises a bandpass filter, and the DC branch comprises an integrator.

10. The apparatus of claim 4, wherein the compensator comprises:
  an alpha gain circuit having an input coupled to the first input of the compensator;
  a beta gain circuit having an input coupled to an output of the compensator; and
  a summer having an first input coupled to an output of the alpha gain circuit, and a second input coupled to the second input of the compensator, a third input coupled to an output of the beta gain circuit.

11. The apparatus of claim 5, wherein the power stage further comprises:
  a driver having an input coupled to an output of the control loop;
  at least one power transistor having an input coupled to an output of the driver; and
  a filter having an input coupled to an output of the at least one power transistor.

12. The apparatus of claim 7, wherein the threshold detection circuit comprises:
  a steady state control and counters circuit configured to receive the output of the zero voltage detect circuit, and at least one steady state threshold, and having an output coupled to the first multiplexor; and
  an absolute value circuit having an output coupled to the steady state control and counters circuit, and coupled to an output of the subtractor.

13. The apparatus of claim 8, further comprising a gain block coupled between the output of the first multiplexor and an input of the second multiplexor.

14. The apparatus of claim 12, wherein the steady state control and counters circuit comprises:
  an entrance debounce counter having an input coupled to the output of the absolute value circuit, and configured to receive at least one steady state threshold;
  an exit debounce counter having an input coupled to the output of the absolute value circuit, and configured to receive at least one steady state threshold; and
  a steady state entrance or exit control circuit coupled to an input of the first multiplexor, an output of the entrance debounce counter, an output of the exit debounce counter, the output of the zero voltage detection circuit.

15. The apparatus of claim 13, further comprising:
  an offset voltage; and
  a summer coupled to the offset voltage and an output of the second multiplexor.

16. A system, comprising:
  a control loop further comprising:
    a compensator;
    a PWM signal generator coupled to an output of the compensator and configured to generate a PWM signal;
    a reference circuit configured to receive a tracking signal, and which is configured to low bandwidth low pass filter the tracking signal when an amplitude of the tracking signal becomes substantially constant and representative of an output voltage that is substantially non-zero; and
    an error amplifier having a first input coupled to an output of the reference circuit, a second input configured to receive an output voltage sense signal, and an output coupled to the compensator;
  a power stage configured to receive the PWM signal, and configured to generate the output voltage sense signal; and
  a load coupled to an output of the power stage.

17. The system of claim 16, wherein the load comprises a processing system coupled to an output of the power stage.

18. The system of claim 16, wherein the reference circuit comprises:
  a low bandwidth low pass filter (LB LPF) configured to low bandwidth low pass filter the tracking signal;
  a zero voltage detect circuit configured to receive the tracking signal;
  a subtractor configured to subtract a low bandwidth low pass filtered tracking signal from the tracking signal;
  a threshold detection circuit configured to receive an output of the zero voltage detect circuit, an output of the subtractor and at least one steady state threshold; and
  a first multiplexor configured to receive the output of the threshold detection circuit, the tracking signal, and the low bandwidth low pass filtered tracking signal.

19. The system of claim 16, wherein the control loop further comprises a telemetry circuit configured to receive the tracking signal, and having an output coupled to the reference circuit.

20. A method for operating a DC-DC voltage converter, comprising:
  determining whether a tracking signal has entered steady state, and an output voltage of the DC-DC voltage converter is substantially non-zero;
  if the tracking voltage has entered steady state and an output voltage is substantially non-zero, then filter the tracking signal; and
  calculating a difference between an amplitude of the output tracking signal and a signal representative of the output voltage.

21. The method of claim 20, further comprising:
  low bandwidth, low pass filtering the tracking signal;
  selecting an output tracking signal;
  wherein determining whether a tracking voltage has entered steady state, and an output voltage of the DC-DC voltage converter is substantially non-zero further comprises:
    determining if the tracking signal is in steady state and if an amplitude of the tracking signal is not equal to substantially a first threshold level representative of a zero volt output voltage of the DC-DC voltage converter; and
  wherein if the tracking voltage has entered steady state and an output voltage is substantially non-zero, increase the filtering of the tracking voltage further comprises:
    if the tracking signal is in steady state and if the amplitude of the tracking signal is not substantially equal to the first threshold level, then initiate a first timer having a first time period;
    if during the first time period, the tracking signal remains in steady state and if the amplitude of the tracking signal remains not substantially equal to the first threshold level, then select a low bandwidth, low pass filtered tracking signal as the output tracking signal.

22. The method of claim 20, further comprising modifying the amplitude of the output tracking voltage.

23. The method of claim 20, further comprising high bandwidth, low pass filtering the tracking signal.

24. The method of claim 20, further comprising digitizing the tracking signal.

25. The method of claim 21, further comprising:
upon selecting the low bandwidth, low pass filtered tracking signal as the output tracking signal, if at least one of (a) the tracking signal is not in steady state and (b) the amplitude of the tracking signal is substantially equal to the first threshold level, then initiate a second timer having a second time period; and
if during the second time period, if at least one of (a) the tracking signal is not in steady state and (b) the amplitude of the tracking signal remains substantially equal to the first threshold level, then select the high bandwidth, low pass filtered tracking signal as the output tracking signal.

26. The method of claim 23, wherein selecting the output tracking signal further comprises selecting the output tracking signal that is the high bandwidth low pass filtered tracking signal.

* * * * *